US012702098B2

(12) United States Patent
Larsen

(10) Patent No.: US 12,702,098 B2
(45) Date of Patent: Aug. 11, 2026

(54) DEVICES, SYSTEMS, AND METHODS FOR IRRIGATION MANAGEMENT

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

( * ) Notice: Subject to any disclaimer, the term of this patent is extended or adjusted under 35 U.S.C. 154(b) by 413 days.

(21) Appl. No.: 18/136,571

(22) Filed: Apr. 19, 2023

(65) Prior Publication Data

US 2024/0349666 A1 Oct. 24, 2024

(51) Int. Cl.
*A01G 25/16* (2006.01)
*G05B 19/042* (2006.01)

(52) U.S. Cl.
CPC ......... *A01G 25/165* (2013.01); *G05B 19/042* (2013.01); *G05B 2219/2625* (2013.01)

(58) Field of Classification Search
CPC ................ A01G 25/165; G05B 19/042; G05B 2219/2625
See application file for complete search history.

(56) References Cited

U.S. PATENT DOCUMENTS

2008/0062940 A1* 3/2008 Othmer .................. H04W 4/20 370/278
2015/0319941 A1* 11/2015 Klein ................ G05B 19/0426 700/284
2016/0091879 A1* 3/2016 Marti ................. H04L 12/2816 700/275
2018/0014480 A1* 1/2018 Montgomery ......... A01G 25/16
2021/0243824 A1* 8/2021 Cariou ................ H04W 74/006
2024/0260521 A1* 8/2024 Huffman .............. A01G 25/167
2024/0302824 A1* 9/2024 Alaghehband ... G05B 19/41845
2024/0324527 A1* 10/2024 Price .................... A01G 25/165

* cited by examiner

*Primary Examiner* — Chad G Erdman
(74) *Attorney, Agent, or Firm* — RAY QUINNEY & NEBEKER; Thomas L. Lingard

(57) ABSTRACT

An irrigation manager may connect a plurality of irrigation controllers to a local irrigation network. The irrigation manager may connect the local irrigation network to a cloud-based irrigation network. The irrigation manager may connect one of the plurality of irrigation controllers to third-party device in range of the one of the plurality of irrigation controllers. The irrigation manager may receive third-party irrigation information from the third-party device via the one of the plurality of irrigation controllers. The irrigation manager may adjust an irrigation program based on the third-party irrigation information.

10 Claims, 7 Drawing Sheets

DEVICES, SYSTEMS, AND METHODS FOR IRRIGATION MANAGEMENT

CROSS-REFERENCE TO RELATED APPLICATIONS

N/A.

BACKGROUND

Irrigation systems provide water to plants from a main water line, or water main. The water main has a capacity, which is typically measured in terms of a volumetric flow rate, such as gallons per minute (GPM). The water main capacity may be measured using other hydraulic parameters, such as pressure. Some irrigation systems may use one or more irrigation devices, such as a sprinkler head. These may help to deliver the irrigation water over an area. In some situations, the watering area to be irrigated (or watered) may utilize more water than is available from the water main. To water the entire watering area, an irrigation operator may separate this area into two or more zones. The irrigation devices in the zones may be connected to the water main through a valve. The valve may be opened and closed using an irrigation controller.

In some situations, an irrigation controller may control multiple zones. For example, an irrigation controller may control 2, 3, 4, 5, 6, 7, 8, 9, 10, 15, 20, 30, 40, 50, or more zones. In some situations, the watering area may include more zones than a single irrigation controller may control. To irrigate the entire watering area, an irrigation operator may utilize multiple irrigation controllers. The irrigation controllers are typically installed at or near the physical location of their respective zones, thereby reducing the piping and/or wiring between the controller and the irrigation devices.

BRIEF SUMMARY

In some aspects, the techniques described herein relate to a method for irrigation management. The method includes connecting a plurality of irrigation controllers to a local irrigation network. The local irrigation network is connected to a cloud-based irrigation controller connected to a cloud-based network. The local irrigation network is connected to a third-party device in range of the one of the plurality of irrigation controllers. The third-party device is not in direct communication with the cloud-based network. Third-party irrigation information is received from the third-party device via the one of the plurality of irrigation controllers.

In some aspects, the techniques described herein relate to a method for irrigation management. The method includes connecting a plurality of irrigation controllers to a local irrigation network. An irrigation manager connects the local irrigation network to a cloud-based irrigation network. The irrigation manager connects one of the plurality of irrigation controllers to a third-party device in range of the one of the plurality of irrigation controllers. The irrigation manager receives third-party irrigation information from the third-party device via the one of the plurality of irrigation controllers. The irrigation manager adjusts an irrigation program based on the third-party irrigation information received from the third-party device.

In some aspects, the techniques described herein relate to a method implemented at a local irrigation controller. The local irrigation controller receives irrigation instructions from a cloud-based irrigation controller. Irrigation information is received from a third-party device. The local irrigation controller transmits the irrigation information to the cloud-based irrigation controller. The local irrigation controller receives adjusted irrigation instructions from the cloud-based irrigation controller, the adjusted irrigation instructions being updated at the cloud-based irrigation controller based on the irrigation information received from the third-party device.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for irrigation control of an irrigation system. A local irrigation controller may be connected to a cloud-based irrigation controller. The cloud-based irrigation controller may send irrigation instructions to the local irrigation controller, such as watering time(s), time(s) of day, duration(s), flow rate(s), other irrigation instructions, or combinations thereof for one or more of the watering zones controlled by the irrigation controller. The local irrigation controller may be part of a local irrigation network. The local irrigation network may be a local network in which multiple irrigation controllers and/or irrigation devices may be in communication with each other. The local irrigation controller may be in communication range of a third-party device. The third-party device may not be in direct communication with the cloud-based irrigation network. The local irrigation controller may connect with the third-party device. The third-party device may provide third-party irrigation information to the local irrigation controller. The local irrigation controller may forward the third-party irrigation information to the cloud-based irrigation controller. Based on the third-party irrigation information, the cloud-based irrigation controller may prepare and/or adjust irrigation instructions for the local irrigation controller. The cloud-based irrigation controller may transmit the adjusted irrigation instructions to the local irrigation controller, which may then implement the adjusted irrigation instructions.

At least one embodiment of the cross-network irrigation system described herein provides many advantages and benefits over conventional systems and methods. For example, by accessing third-party devices, the cross-network irrigation system may have access to information otherwise unavailable to the cloud-based irrigation network. This may help the cloud-based irrigation controller to prepare revisions and/or adjustments to the irrigation program that incorporate the third-party irrigation information. These revisions and/or adjustments to the irrigation program may result in improved irrigation of the watering area.

In accordance with at least one embodiment of the present disclosure, the local irrigation controller may connect to the third-party device. For example, the local irrigation controller may connect to the third-party device over a third-party network. The third-party network may be separate from the local irrigation network. The third-party device may not be connected to the local irrigation network. The local irrigation controller may detect the presence of the third-party device and request a connection. In some embodiments, the third-party device may accept the connection request. In some embodiments, the local irrigation controller may be connected directly to the third-party device.

Figure 1:
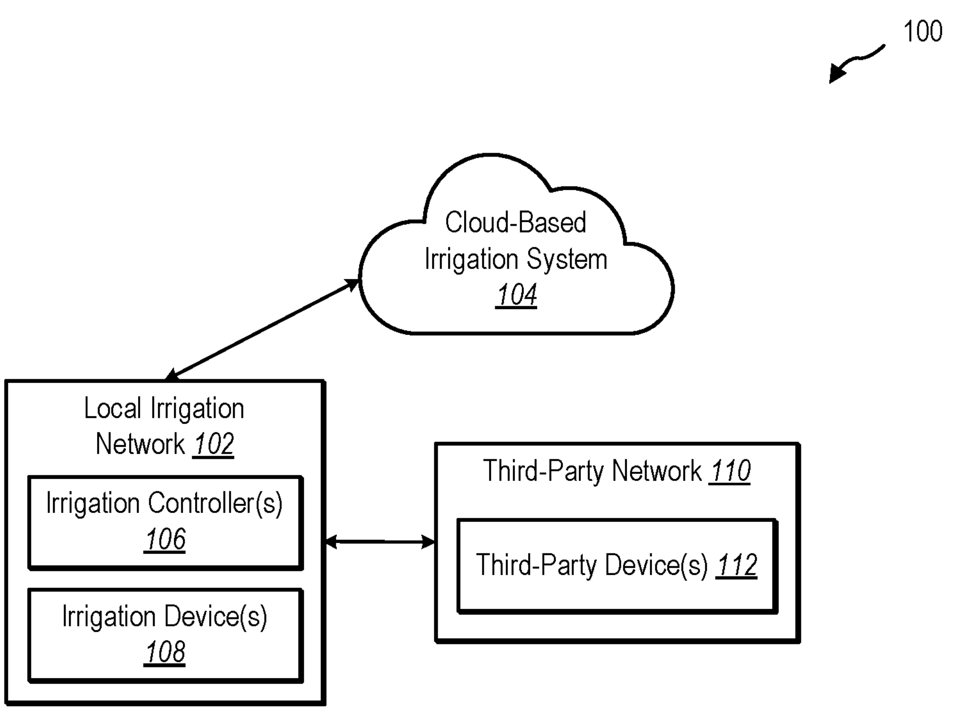
FIG. 1 is a representation of a cross-network irrigation system, according to at least one embodiment of the present disclosure.

FIG. 1 is a representation of a cross-network irrigation system 100, according to at least one embodiment of the present disclosure. The cross-network irrigation system 100 includes a local irrigation network 102 that is connected to a cloud-based irrigation network 104. The local irrigation network 102 may include one or more local irrigation controllers 106. The local irrigation controllers 106 may be in control of one or more irrigation zones. The local irrigation controllers 106 may be electronically connected to one or more irrigation devices 108. The irrigation devices 108 may include any type of irrigation device. For example, the irrigation devices 108 may include valves, sprinkler heads, flow sensors, moisture sensors, weather sensors, any other irrigation device, and combinations thereof.

In some embodiments, the irrigation devices 108 may include a valve in a water line. The valve may control the flow of water from a water main to various sprinkler heads and other irrigation devices 108. The local irrigation controllers 106 may instruct the valve to open at a particular time of day, stay open for a particular duration, and close after the duration. The water main may have a limited water supply, and so a watering system may include multiple valves that direct water to multiple watering zones. Each of the local irrigation controllers 106 may be able to control a number of zones or other irrigation devices 108. In some situations, the watering area may have more zones than a single local irrigation controller 106 may control. The local irrigation network 102 may include multiple local irrigation controllers 106 to control all of the watering zones.

In some embodiments, the local irrigation controllers 106 and/or the irrigation devices 108 may be in communication over the local irrigation network 102. For example, each of the local irrigation controllers 106 may be in communication with each other over the local irrigation network 102. In some embodiments, the irrigation devices 108 may be in communication with one or more of the local irrigation controllers 106 over the local irrigation network 102.

In some embodiments, the local irrigation network 102 may be a wireless network. For example, the local irrigation network 102 may include a Wi-Fi network, and one or more of or each of the local irrigation controllers 106 and/or the irrigation devices 108 may be connected to the Wi-Fi network. In some examples, the local irrigation network 102 may include other wireless communications between the local irrigation controllers 106 and/or irrigation devices 108. Such wireless communications may include radio communications, infrared, Bluetooth, Zigbee protocol, cellular networks, any other wireless communication system or method, and combinations thereof.

In accordance with at least one embodiment of the present disclosure, a third-party network 110 may be located within communication range of one or more devices connected to the local irrigation network 102. For example, the third-party network 110 may overlap (e.g., one or more signals may be receivable at) at least a portion of the local irrigation network 102. In some examples, a device may receive signals from both the third-party network 110 and the local irrigation network 102.

One or more third-party devices 112 may be connected to the third-party network 110. The third-party devices 112 may be devices that are not part of the local irrigation network 102. In some embodiments, the third-party devices 112 may not be owned by (e.g., under direct or indirect control of) or otherwise associated with the local irrigation network 102 and/or the cloud-based irrigation network 104, the owners or operators of the local irrigation network 102 and/or the cloud-based irrigation network 104, or otherwise associated with the local irrigation network 102 and/or the cloud-based irrigation network 104.

The third-party devices 112 may be any type of device. For example, the third-party devices 112 may include any internet-of-things (IOT) device. In some examples, the third-party devices 112 may detect irrigation conditions of plants and/or soil in the watering area. In some examples, the third-party devices 112 may detect soil moisture, soil pH, soil chemistry, other irrigation conditions of the plants and/or soil in the watering area, and combinations thereof. In some examples, the third-party devices 112 may detect fluid properties of a fluid flow through the third-party devices 112, such as flow rate, pressure, and so forth. In some examples, the third-party devices 112 may collect weather information.

For example, the third-party devices 112 may detect temperature, humidity, rainfall, wind speed, wind direction, barometric pressure, any other weather information, and combinations thereof. In some embodiments, the third-party devices 112 may collect photographic information of all or a portion of the watering area. For example, the third-party devices 112 may collect photos of a patch of grass or plants. Plants may change colors based on over-watering, under-watering, nutrient levels, the presence of pests, the presence of weeds, temperature, any other condition, and combinations thereof. In some examples, the third-party devices 112 may include one or more irrigation devices, such as a sprinkler head, flow sensor, moisture sensor, weather station, rain sensor, solar intensity sensor, snow sensor, drip sprinkler system, water flow sensor, valve, any other irrigation device, and combinations thereof. In some examples, the third-party devices 112 may include a computing device in communication with one or more information databases. In some examples, the third-party devices 112 may include any other type of device, and combinations thereof.

In accordance with at least one embodiment of the present disclosure, an element of the local irrigation network 102 may connect to one or more of the third-party devices 112 on the third-party network 110. For example, one of the local irrigation controllers 106 may connect to one of the third-party devices 112. The local irrigation controller 106 may wirelessly connect to the third-party device 112. In some embodiments, the third-party device 112 may send information to the local irrigation controller 106. For example, the third-party device 112 may send irrigation information to the local irrigation controller 106.

The irrigation information transmitted to the local irrigation controller 106 by the third-party device 112 may be any type of irrigation information. For example, the irrigation information may include irrigation information measured by the third-party device 112 sensor. Such irrigation information may include soil moisture information, temperature information, wind speed information, light information, any other type of measured information, and combinations thereof. In some embodiments, the irrigation information may include irrigation information related to the operation of an irrigation device. For example, the irrigation device irrigation information may be related to sprinkler head, such as flow rate, irrigation time, irrigation time of day, any other irrigation device irrigation information, and combinations thereof. In some embodiments, the irrigation information may include irrigation information obtainable from an information database. In some embodiments, the information database may be accessible to devices connected to the third-party network 110. In some embodiments, the information database may be inaccessible to devices connected to the local irrigation network 102 and/or the cloud-based irrigation network 104. Put another way, the irrigation information may be information that is not otherwise obtainable by devices connected to the local irrigation network 102 and/or the cloud-based irrigation network 104.

In some embodiments, the local irrigation controller 106 may transmit the received irrigation information to the cloud-based irrigation network 104. For example, the local irrigation controller 106 may transmit the irrigation information to the cloud-based irrigation network 104 through the local irrigation network 102. Put another way, the local irrigation controller 106 may relay the irrigation information from the third-party devices 112 and/or the third-party network 110 to the cloud-based irrigation network 104. In some embodiments, the local irrigation controller 106 may relay the irrigation information from the third-party devices 112 and/or the third-party network 110 through the local irrigation network 102.

In some embodiments, an irrigation manager in the cloud-based irrigation network 104 may analyze the irrigation information. The irrigation manager may determine one or more irrigation instructions using the irrigation information. In some embodiments, the irrigation manager may determine a change to one or more irrigation instructions for the local irrigation network 102 using the irrigation information from the third-party devices 112. In some embodiments, the irrigation manager may determine an update to one or more irrigation instructions for the local irrigation network 102 using the irrigation information from the third-party devices 112.

As a non-limiting example, the third-party devices 112 may provide the connected local irrigation controllers 106 with irrigation information related to soil moisture content. The soil moisture content may be located physically close to and/or within one or more of the watering zones of the local irrigation network 102. This may allow the irrigation manager to determine and/or infer, using data not directly available to it, the soil moisture level at the irrigation zone. Using the soil moisture levels, the irrigation manager may update the irrigation instructions for the irrigation zone. The irrigation manager may transmit the irrigation instructions to the local irrigation network 102, and the local irrigation controllers 106 may implement the irrigation instructions. In this manner, watering of the irrigation zone may experience improved efficiency and/or effectiveness.

As another non-limiting example, the third-party devices 112 may provide the connected local irrigation controllers 106 with irrigation information related to weather information, such as temperature information, precipitation information, wind information, any other weather information, and combinations thereof. The local irrigation controllers 106 may pass the weather information to the cloud-based irrigation network 104. The irrigation manager may receive the weather information. Using the weather information, the irrigation manager may prepare revised irrigation instructions for the local irrigation network 102. For example, the if the weather information includes a forecast for high winds, the irrigation manager may instruct the local irrigation network 102 to reduce and/or delay watering by spray-head sprinkler heads, thereby reducing wind losses from the sprayed irrigation. In some examples, if the weather information includes a forecast for hot weather, the irrigation manager may instruct the local irrigation network 102 to increase watering. In some embodiments, the irrigation manager may determine the amount to increase watering. For example, based on theoretical and/or empirical data (based on laboratory testing and/or historical records), the irrigation manager may increase watering by a specific amount determined by the amount and/or duration of the increase in temperature. In some examples, if the weather information includes a forecast for rain, the irrigation manager may instruct the local irrigation network 102 to decrease watering. In some embodiments, the irrigation manager may determine the amount to decrease watering. For example, based on theoretical and/or empirical data (based on laboratory testing and/or historical records), the irrigation manager may decrease watering by a specific amount determined by the amount and/or duration of the rainfall. As will be understood, the irrigation manager may adjust the watering of the local irrigation network 102 based on any weather phenomenon.

As another non-limiting example, the third-party devices 112 may provide the local irrigation network 102 with worker schedules and/or scheduled projects. The work information may be otherwise unavailable and/or inaccessible by the local irrigation network 102 and/or the cloud-based irrigation network 104. For example, the work information may be work information for a work crew unrelated and/or unassociated with the company operating the cloud-based irrigation network 104 and/or the local irrigation network 102 or the watering area of the local irrigation network 102. For example, the third-party devices 112 may provide the local irrigation network 102 with one or more scheduled projects to be performed at or adjacent to one or more irrigation zones of the local irrigation network 102. The local irrigation controllers 106 may pass the work information to the cloud-based irrigation network 104. The irrigation manager may change the day, time of day, and/or duration of the irrigation instructions for one or more zones of the local irrigation network 102 based on the work information. This may allow the watering schedule to be coordinated with a work schedule.

While specific examples have been provided herewith, it should be understood that the disclosure is not limited to the provided examples. The third-party devices 112 of the third-party network 110 may provide the irrigation manager at the cloud-based irrigation network 104, through the local irrigation controllers 106 at the local irrigation network 102, with any type of irrigation information. The irrigation manager may utilize the irrigation information in any manner to adjust the irrigation instructions for the local irrigation network 102. The adjusted irrigation instructions may include any type of adjustments to the irrigation instructions. For example, the adjusted irrigation instructions may include an adjustment to the watering schedule, including the duration, time of day, calendar day, day of the week, time between waterings, any other adjustment to the watering schedule, and combinations thereof.

In some embodiments, the irrigation manager may adjust the irrigation instructions by adjusting the zones of the local irrigation network 102. For example, the irrigation manager may adjust which irrigation devices 108 are associated with which zones. In some embodiments, the irrigation devices 108 may be adjusted automatically. In some embodiments, the irrigation manager may provide an operator with instructions to adjust the irrigation zones based on the received irrigation information.

In the embodiment illustrated in FIG. 1, one or more of the local irrigation controllers 106 of the local irrigation network 102 are connected to a single third-party network 110. However, it should be understood that one or more of the local irrigation controllers 106 of the local irrigation network 102 may be connected to multiple different third-party networks 110. In some embodiments, a single local irrigation controller 106 may be connected to multiple third-party devices 112 from multiple third-party networks 110. In some embodiments, different local irrigation controllers 106 may be connected to different third-party devices 112 from different third-party network 110. This may allow the irrigation manager at the cloud-based irrigation network 104 to receive irrigation information from multiple sources. In this manner, the irrigation manager may generate improved irrigation instructions, thereby improving the irrigation of the local irrigation network 102.

While embodiments of the present disclosure have described an irrigation controller connecting to the third-party devices 112 and/or the third-party network 110, it should be understood that any other element connected to the local irrigation network 102 may connect to the third-party devices 112 and/or the third-party network 110. For example, a connection device may be connected to the local irrigation network 102 and the third-party network 110. The connection device may connect to the third-party network 110 to communicate with the third-party devices 112. The connection device may collect information from the third-party devices 112 and share that information with the local irrigation controllers 106 on the local irrigation network 102.

In some embodiments, the connection device may be directly connected to the third-party devices 112. For example, the connection device may plug into a communication port, power port, or other connection in the third-party devices 112. The connection device may collect information directly from the third-party devices 112. The connection device may be connected to the local irrigation network 102 and may share the irrigation information from the third-party devices 112 with the cloud-based irrigation network 104.

Figure 2:
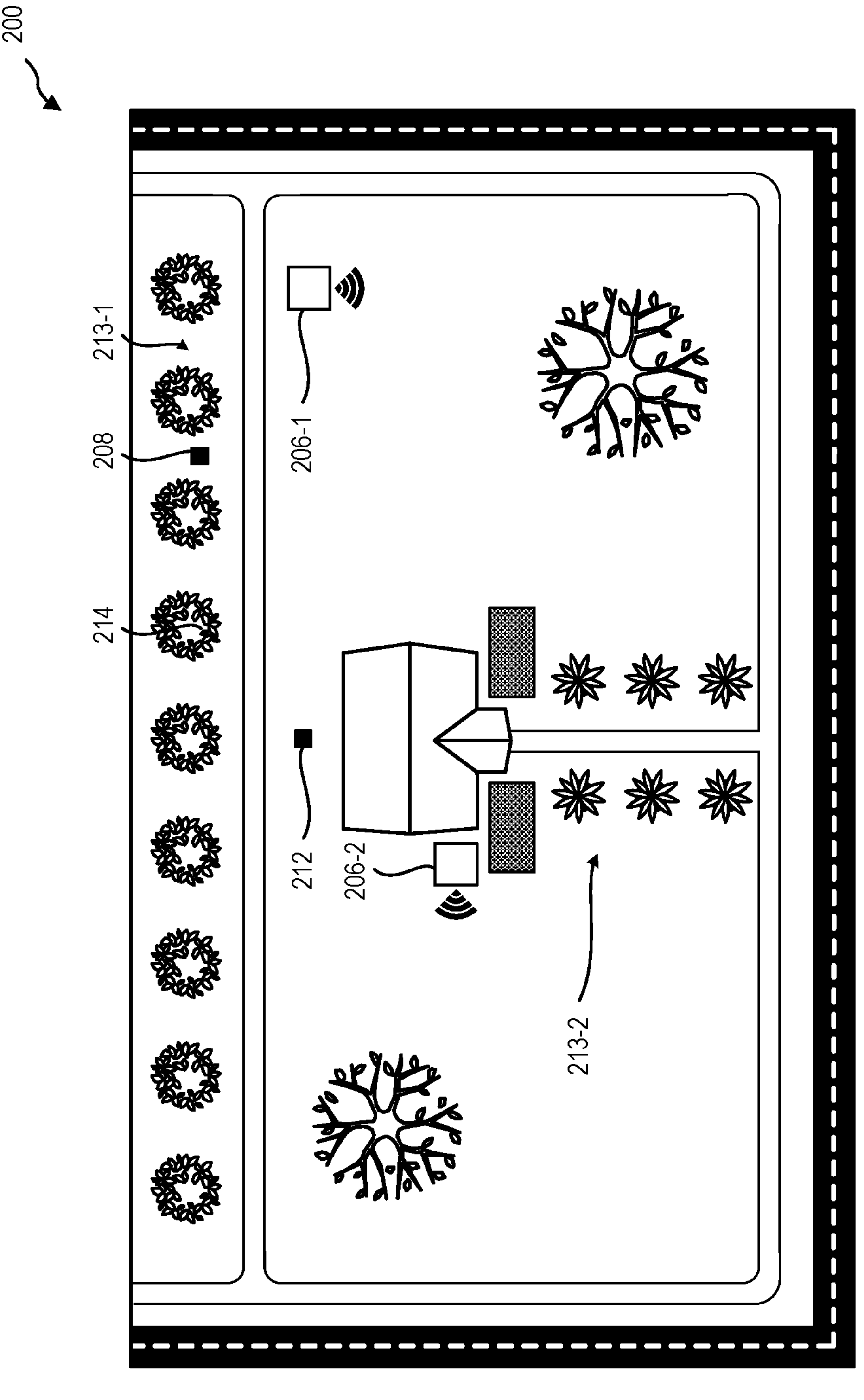
FIG. 2 is a representation of a cross-network irrigation system, according to at least one embodiment of the present disclosure.

FIG. 2 is a representation of a cross-network irrigation system 200, according to at least one embodiment of the present disclosure. The cross-network irrigation system 200 includes a plurality of irrigation controllers (collectively 206). The irrigation controllers 206 may control the watering for a watering area. The watering area may include one or more watering zones (collectively 213). Each watering zone may include one or more irrigation devices 208. The irrigation devices 208 may provide water to one or more plants 214. The irrigation devices 208 may include any type of irrigation device, such as a spray head, a rotary head, a drip irrigation device, any other type of irrigation device, and combinations thereof. In some embodiments, an irrigation device 208 may water a single plant 214. In some embodiments, an irrigation device 208 may provide water to multiple plants 214. The plants 214 may include any type of plant, such as grass, shrubs, flowers, trees, garden plants, crops, any other type of plant, and combinations thereof.

Different irrigation controllers 206 may provide water to different irrigation zones 213. For example, a first irrigation controller 206-1 may control the irrigation to a first zone 213-1 and a second irrigation controller 206-2 may control the irrigation to a second zone 213-2. While two irrigation controllers 206 are shown each controlling a single zone 213, it should be understood that the watering area may include any number of irrigation controllers 206 watering any number of zones 213. For example, a single irrigation controller 206 may control 48 zones or any number of zones.

The irrigation controllers 206 may include any type of irrigation controller. For example, the irrigation controllers 206 may include a single-wire irrigation controller, with multiple valves or other irrigation devices connected to a single common wire. In some examples, the irrigation controllers 206 may include a "two-wire controller." A two-wire controller may connect multiple valves or other irrigation devices in series. A two-wire controller may allow for an increased number of connected valves. In some embodiments, the irrigation controllers 206 may include a wireless irrigation controller. For example, the irrigation controllers 206 may wirelessly connect to the valves and other connected irrigation devices. In some examples, the irrigation controllers 206 may wirelessly connect to each other. In some examples, the irrigation controllers 206 may wirelessly connect to a cloud-based irrigation network. In some embodiments, the irrigation controllers 206 may include any type of irrigation controller connected to one or more valves in any way, including wired connections having any configuration, wireless connections, and combinations thereof. In some embodiments, the cross-network irrigation system 200 may include multiple types of irrigation controllers 206.

The irrigation controllers 206 may receive irrigation instructions from the cloud-based irrigation network. The irrigation instructions may include local irrigation programs for their associated zones 213. In some embodiments, an irrigation program may include a time of day to water for a particular zone 213 and/or set of zones 213. In some embodiments, an irrigation program may include a duration to water for a particular zone 213 and/or set of zones 213. In some embodiments, an irrigation program may include times during which to collect irrigation conditions from one or more third-party devices 212, as discussed herein. In some embodiments, the irrigation program may be a local irrigation program associated with the particular irrigation controller 206. In some embodiments, a local irrigation program may include controls for any other operation or combinations of operations performed by the irrigation controller 206.

In some embodiments, a single zone 213 may utilize all of the water provided by a water main. In some embodiments a single zone 213 may utilize a portion of the water provided by the water main. A zone 213 may be provided for a group of plants having similar watering patterns. In some examples, the zone 213 may be provided for a group of the same plant. In some embodiments, the zone 213 may be provided based on the capacity of the water main and the water usage of the irrigation devices 208. For example, a grassy field may include multiple zones 213, each of which max out the water main.

In some embodiments, selecting which zones 213 are simultaneously actuated may be referred to as "stacking" the irrigation system. Stacking the zones 213 may be based on any irrigation factor. For example, the zones 213 may be stacked to use all or most of the available water supply from the water main. This may result in zones 213 that are not adjacent to each other to be part of the same stack. In some examples, stacked zones 213 may have the same irrigation duration. In some examples, stacked zones 213 may have different durations. This may result in a first zone being actuated while a second zone is still running. In this manner, different zones having different durations may be stacked to reduce the opportunity costs of lost water supply from the water main.

In some embodiments, a stack may be a cross-controller stack that include two zones 213 associated with different irrigation controllers 206. For example, the first zone 213-1 and the second zone 213-2 may be simultaneously actuated as part of the same stack. Actuating zones 213 from different irrigation controllers 206 may allow the irrigation operator to utilize all of the water supply from the water main.

In some embodiments, when the cloud-based irrigation controller sends the irrigation instructions and/or updated irrigation instructions to the irrigation controllers 206, the cloud-based irrigation controller may instruct the irrigation controllers 206 consistent with any stack, cross-controller stack, irrigation devices 208, any other element of the cross-network irrigation system 200, and combinations thereof.

As may be seen, the irrigation controllers 206 may be physically located within one of the zones 213 they control and/or proximate one or more of the zones 213 they control. For example, the first irrigation controller 206-1 is shown as proximate to the first zone 213-1. The second irrigation controller 206-2 is shown as proximate to the second zone 213-2. The irrigation controllers 206 may be located within or proximate the single zone 213 to reduce the wiring length and/or the piping to the valves and/or irrigation devices 208 of the respective zones. As discussed herein, to adjust the programming of the irrigation controllers 206, the irrigation operator may physically interact with the irrigation controllers 206, which may take time, effort, and money for the irrigation operator.

The cross-network irrigation system 200 may include one or more third-party devices 212 connected to a third-party network. As discussed herein, the third-party devices 212 may be any third-party device, including IOT devices. In some embodiments, one or more of the third-party devices 212 on the third-party network may be in communication with one or more of the irrigation controllers 206 on the local irrigation network. For example, one or more of the third-party devices 212 may be located in communication range with a particular irrigation controller 206. The irrigation controllers 206 may detect the presence of the third-party devices 212 and may request access to the third-party devices 212 and/or request irrigation information from the third-party devices 212. Put another way, the third-party devices 212 may communicate with the irrigation controllers 206.

In accordance with at least one embodiment of the present disclosure, the irrigation controllers 206 may be in communication with the internet. Put another way, the irrigation controllers 206 may include a communication device that connects the irrigation controllers 206 to the internet. In some embodiments, the irrigation controllers 206 may have two-way communication with the internet. In some embodiments, the irrigation controllers 206 may be tethered to a cloud-based irrigation controller. For example, the irrigation controllers 206 may be tethered to the cloud-based irrigation controller over the internet. The cloud-based irrigation controller may receive irrigation information from the irrigation controllers 206 and provide irrigation instructions to the irrigation controllers 206.

While irrigation controllers 206 are described and illustrated as being in communication over the internet, it should be understood that the irrigation controllers may operate independent of the internet. For example, the irrigation controllers 206 may include local memory. The local memory may include the irrigation program for the local irrigation controller 206. The local irrigation controller 206 may implement the irrigation program from the local memory. This may help to reduce data usage and bandwidth requirements for the local irrigation controller 206. In some embodiments, if the local irrigation controller 206 is disconnected from the internet (for any reason), the local irrigation controller may still implement the local irrigation program. This may help to provide redundancy in the cloud-based irrigation system.

As discussed herein, the irrigation program may be stored on the local memory. In some embodiments, the local irrigation controller 206 may not be able to make changes to the irrigation program stored on the local memory. For example, an irrigation operator may not be able to adjust the irrigation program stored on the local memory. In some embodiments, the irrigation program may only be changed from an internet connection. In some embodiments, the irrigation program may be changed locally after receiving approval from the cloud-based irrigation controller to which the local irrigation controller 206 is tethered. This may help to prevent unintentional and/or unauthorized changes to the irrigation program.

In some embodiments, the irrigation controllers 206 may be constantly connected to the internet (except for unexpected internet outages). In some embodiments, the irrigation controllers 206 may periodically or episodically connect to the internet. For example, the irrigation controllers 206 may periodically connect to the internet every second, every 10 seconds, every 30 seconds, every minute, every 10 minutes, every 30 minutes, every hour, every 12 hours, every day, every week, every month, every season, every year, or any timeframe therebetween. In some embodiments, the irrigation controllers may episodically connect to the internet when an event occurs, such as when new equipment is installed, an alarm is triggered, a user instructs that irrigation controller, a certain amount of irrigation information has been collected, any other episode, and combinations thereof.

In some embodiments, the local memory may include a storage cache. The storage cache may store irrigation information collected by the local irrigation controller 206, including irrigation information collected from the third-party devices 212. In some embodiments, the local storage may store irrigation information until the irrigation information is uploaded to the cloud-based irrigation controller. For example, the local storage may store the irrigation information collected during an interruption to internet service, and may upload the irrigation information when internet service is restored. In some example the local storage may store the irrigation information between periodic or episodic internet connections, and may upload the stored irrigation information at the time of connection to the internet.

As discussed herein, the irrigation controllers 206 may provide the cloud-based irrigation controller with irrigation information collected from the third-party devices 212. In some embodiments, the irrigation information may include irrigation conditions detected by the third-party devices 212. The irrigation controllers 206 may send the collected irrigation information to the irrigation manager in the cloud-based irrigation network.

In some embodiments, the irrigation manager at the cloud-based irrigation controller may generate revised irrigation instructions and provide them to the tethered irrigation controllers 206. For example, the irrigation instructions may include a change to the irrigation program for one or more of the irrigation controllers 206. In some examples, the cloud-based irrigation controller may provide instructions regarding the time of day one or more zones 213 waters and/or the duration that one or more zones 213 waters.

The cloud-based irrigation controller may generate and/or update irrigation instructions using the irrigation information. For example, the cloud-based irrigation controller may generate the irrigation instructions based on the irrigation information received from the third-party devices 212. The irrigation instructions may be at least partially based on the irrigation information. For example, the irrigation instructions may adjust a watering day, time of day and/or duration based on the irrigation information. In some examples, the irrigation instructions may adjust a watering day, time of day and/or duration based on irrigation conditions.

In some embodiments, the cloud-based irrigation controller may generate and/or update a master irrigation program using the irrigation information from the third-party devices 212. The master irrigation program may include watering days, times of day, and durations for the zones 213 in the watering area. For example, the master irrigation program may include watering days, times of day, and durations for each zone 213 associated with each irrigation controller 206 tethered to the cloud-based irrigation controller.

Figure 3:
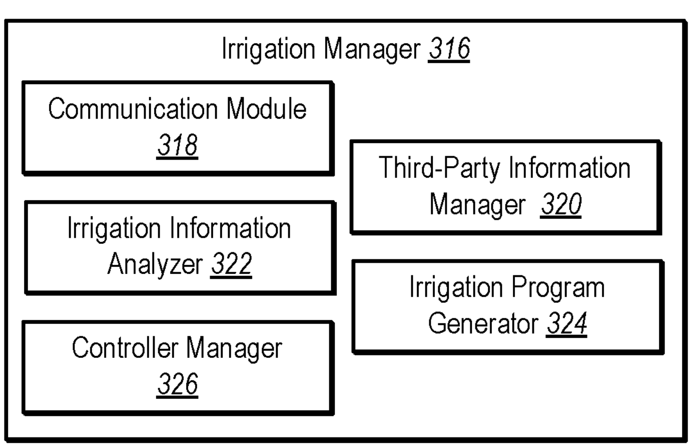
FIG. 3 is a schematic representation of an irrigation manager, according to at least one embodiment of the present disclosure.

FIG. 3 is a schematic representation of an irrigation manager 316, according to at least one embodiment of the present disclosure. Each of the components of the irrigation manager 316 can include software, hardware, or both. For example, the components can include one or more instructions stored on a computer-readable storage medium and executable by processors of one or more computing devices, such as a client device or server device. When executed by the one or more processors, the computer-executable instructions of the irrigation manager 316 can cause the computing device(s) to perform the methods described herein. Alternatively, the components can include hardware, such as a special-purpose processing device to perform a certain function or group of functions. Alternatively, the components of the irrigation manager 316 can include a combination of computer-executable instructions and hardware.

Furthermore, the components of the irrigation manager 316 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The irrigation manager 316 may be tethered to one or more local irrigation controllers. The irrigation manager 316 may provide irrigation instructions to control the operation of the local irrigation controllers. The irrigation manager 316 may include a communication module 318. The communication module 318 may communicate with the tethered local irrigation controllers. For example, the communication module 318 may communicate with the tethered local irrigation controllers over the internet. In some examples, the communication module 318 may communicate with the tethered local irrigation controllers over a wireless network, such as WiFi or a cellular network. Put another way, the communication module 318 may wirelessly connect over the internet with the tethered local irrigation controller.

In some embodiments, the irrigation manager 316 may include a third-party information manager 320. As discussed herein, the irrigation manager 316 may receive third-party irrigation information from third-party devices connected to the local irrigation controllers. The local irrigation controllers may transmit the third-party irrigation information to the irrigation manager 316. The third-party information manager 320 may receive the third-party irrigation information and correlate it to the various portions of the watering area. For example, the third-party information manager 320 may determine that the third-party irrigation information is related to a particular watering zone and may correlate the third-party irrigation information with the particular watering zone.

The irrigation manager 316 includes an irrigation information analyzer 322. As discussed herein, the irrigation manager 316 may receive, through the communication module 318, irrigation information from the tethered local irrigation controllers, including the third-party irrigation information. The irrigation information analyzer 322 may review the third-party irrigation information and the correlation between the third-party irrigation information and the particular watering zone. For example, the third-party irrigation information may include moisture information at or near the watering zone. The irrigation information analyzer 322 may determine that the watering zone may have a moisture content based on the third-party moisture information.

In some embodiments, the third-party information manager 320 may determine, based on the third-party moisture information, that the irrigation conditions in the watering zone are different than anticipated based on information available to the irrigation manager 316. For example, the irrigation manager 316 may have an anticipated moisture content based on information directly available from the local irrigation controllers, including irrigation patterns and irrigation devices directly connected to the local irrigation controllers. Using the third-party moisture information (or other third-party irrigation information), the third-party information manager 320 may determine that the moisture content of the watering zone is different than anticipated. In this manner, the irrigation manager 316 may use the third-party irrigation information to improve the quality and/or accuracy of the determination of the watering conditions in the watering zone.

While the preceding example has included third-party moisture information, it should be understood that the third-party information manager 320 may analyze any third-party irrigation information. The third-party information manager 320 may analyze the third-party irrigation information and make one or more irrigation determinations, such as a determined moisture content of soil, a determined plant health, a determined plant and/or zone stress, a determined watering amount, a determined watering forecast, a determined weather forecast, a determined soil chemistry, a determined fertilizer content, any other irrigation determinations, and combinations thereof.

In some examples, the irrigation information analyzer 322 may determine or infer a reason for the change in irrigation conditions. For example, the irrigation information analyzer 322 may determine or infer that a stressed plant or watering zone is due to too little water, too much water, pests, weeds, weather conditions, any other source, and combinations thereof. In some examples, the irrigation information analyzer 322 may determine or infer that a different moisture content is based on weather, overspray from neighboring zones, manual watering of the zone, any other cause, and combinations thereof. In some examples, the irrigation information analyzer 322 may determine or infer any cause or source of a change in irrigation conditions. In some examples, the irrigation information analyzer 322 may determine or infer the cause or source of the change in irrigation conditions based on third-party irrigation information received from the third-party irrigation device.

An irrigation program manager 324 may, based on the analysis by the irrigation information analyzer 322, adjust the irrigation program for one or more of the tethered irrigation controllers. For example, the irrigation program manager 324 may adjust the watering day, time of day, duration, or portion of the irrigation program for one or more irrigation zones of a tethered local irrigation controller. In some embodiments, the irrigation program manager 324 may generate a new irrigation program for one or more tethered local irrigation controllers. In some embodiments, the irrigation program manager 324 may adjust the irrigation program based on irrigation information from zones associated with two or more tethered irrigation controllers.

In some embodiments, the irrigation program manager 324 may generate and/or revise the irrigation program for the tethered local irrigation controllers. The irrigation program may be based on the third-party irrigation information received from the third-party devices through the local irrigation controllers. For example, the irrigation program manager 324 may prepare an adjustment to the master irrigation program that transfers a zone between local irrigation controllers. This may help to reduce losses and/or improve efficiencies by adjusting the zones to be more efficiently located. In some examples, the irrigation program manager 324 may prepare an adjustment to the irrigation program to add a zone, split a zone, or otherwise adjust the zones of one or more local irrigation controllers. In some examples, the irrigation program manager 324 may revise the irrigation program to transfer an irrigation device between zones and/or local irrigation controllers. In some examples, the irrigation program manager 324 may revise the irrigation program to change types of an irrigation device, remove an irrigation device, add an irrigation device, adjust settings of an irrigation device, otherwise recommend a change related to an irrigation device, and combinations thereof.

In some embodiments, the irrigation program manager 324 may provide the revised irrigation program to an irrigation operator. The irrigation operator may review the revised irrigation program and implement the change. This may involve physically adjusting piping, valves, and/or irrigation devices to implement the recommended change. Providing a revised irrigation program to adjust zones and/or irrigation devices may help to improve the efficiency of the cloud-based irrigation system.

The irrigation manager 316 includes a controller manager 326. The controller manager 326 may send the revised irrigation program to the irrigation operator and/or revised irrigation instructions to the local irrigation controller. In some embodiments, the controller manager 326 may determine when to send the revised irrigation program and/or the revised irrigation instructions.

In accordance with at least one embodiment of the present disclosure, the controller manager 326 may connect with the local irrigation controllers to determine a communication path between local irrigation controllers. For example, two local irrigation controllers may be part of two different local irrigation networks. The two local irrigation controllers may be connected or in communication as part of a controller network. In some embodiments, the connected local irrigation controllers may communicate independently from the irrigation manager 316. In some embodiments, the controller manager 326 may determine to send information to a second local irrigation controller through the first local irrigation controller. For example, the second local irrigation controller may not be connected to the irrigation manager 316 over the internet. To transmit the revised irrigation instructions to the second irrigation controller, the controller manager 326 may send the irrigation instructions to the first local irrigation controller and instruct the first local irrigation controller to send the irrigation instructions to the second local irrigation controller.

Figure 4:
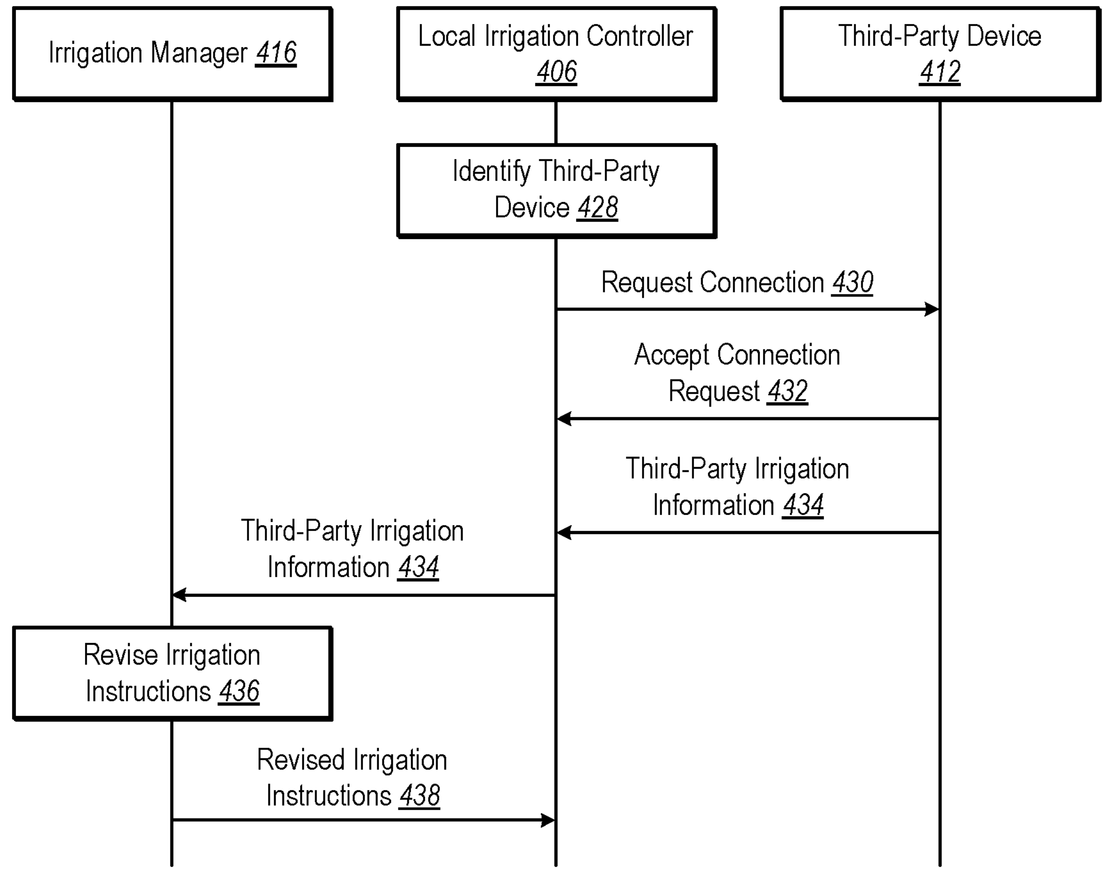
FIG. 4 is a representation of a string diagram of a cross-network irrigation system, according to at least one embodiment of the present disclosure.

FIG. 4 is a representation of a string diagram of a cross-network irrigation system 400, according to at least one embodiment of the present disclosure. A local irrigation controller 406 may identify 428 a third-party device 412 in communication range of the local irrigation controller 406. For example, the local irrigation controller 406 may identify the third-party device 412 based on signals transmitted by the third-party device 412. In some examples, the local irrigation controller 406 may identify the third-party device 412 based on the presence of a third-party network. In some examples, the local irrigation controller 406 may identify the third-party device 412 based on a ping transmitted within the communication range of the local irrigation controller 406.

The third-party device 412 may be located within communication range of the local irrigation controller 406. For example, the third-party device 412 may be located within wireless transmittal and receiving range of one or more wireless antennas or other wireless transmission mechanisms on the local irrigation controller 406. In some embodiments, the local irrigation controller 406 may be located within communication range of the third-party device 412. For example, the local irrigation controller 406 may be located within wireless transmittal and receiving range of one or more wireless antennas or other wireless transmission mechanisms on the third-party device 412.

When the local irrigation controller 406 identifies that the third-party device 412 is within communication range of the third-party device 412, the local irrigation controller 406 may request 430 a connection with the third-party device 412. In some embodiments, the request may occur over the third-party network. For example, the local irrigation controller 406 may identify the third-party network and request access to the third-party device 412 from the third-party network. In some embodiments, the request may be directly transmitted to the third-party device 412.

In some embodiments, the third-party device 412 may accept 432 the connection request and connect to the local irrigation controller 406. In some embodiments, the third-party device 412 may connect to the local irrigation controller 406 over the third-party network. For example, the local irrigation controller 406 may connect to the third-party network, and the local irrigation controller 406 may connect to the third-party device 412 over the third-party network. In some embodiments, the local irrigation controller 406 may directly connect to the third-party device 412. For example, the local irrigation controller 406 may transmit messages directly to the third-party device 412 and the third-party device 412 may transmit responses directly back to the local irrigation controller 406.

In some embodiments, the connection between the local irrigation controller 406 and the third-party device 412 may be a limited connection. For example, the connection between the local irrigation controller 406 and the third-party device 412 may allow the third-party device 412 to transmit information to the local irrigation controller 406 but may limit other information accessible by the local irrigation controller 406. In some examples, the local irrigation controller 406 may not have access to any other information or portion of the third-party network. This may help to limit the security risk of the connection of the local irrigation controller 406 with the third-party device 412.

The third-party device 412 may transmit to the local irrigation controller 406 third-party irrigation information 434. In some embodiments, the third-party device 412 may only transmit the third-party irrigation information 434 to the local irrigation controller 406. In some embodiments, the third-party device 412 may transmit the third-party irrigation information 434 to the local irrigation controller 406 based on a request from the local irrigation controller 406. In some embodiments, the third-party device 412 may transmit the third-party irrigation information 434 to the local irrigation controller 406 periodically, such as multiple times per second, every second, every 30 seconds, every minute, every 30 minutes, every hour, twice per day, daily, weekly, monthly, yearly, any time therebetween, and combinations thereof. In some embodiments, the third-party device 412 may transmit the third-party irrigation information 434 to the local irrigation controller 406 episodically. For example, the third-party device 412 may transmit the third-party irrigation information 434 to the local irrigation controller 406 based on a trigger condition, such as a request from the local irrigation controller 406, a change in the irrigation information, a threshold sensor measurement, any other trigger condition, and combinations thereof.

In some embodiments, the local irrigation controller 406 may transmit the third-party irrigation information 434 to an irrigation manager 416 connected to the local irrigation controller 406 over a cloud-based irrigation network. The irrigation manager 416 may receive the third-party irrigation information 434 and revise 436 the irrigation instructions. The irrigation manager 416 may transmit the revised irrigation instructions 438 to the local irrigation controller 406. The local irrigation controller 406 may then implement the revised irrigation instructions 438. In this manner, the cross-network irrigation system 400 may prepare the revised irrigation instructions 438 to improve the quality and/or efficiency of the watering system.

Figure 5:
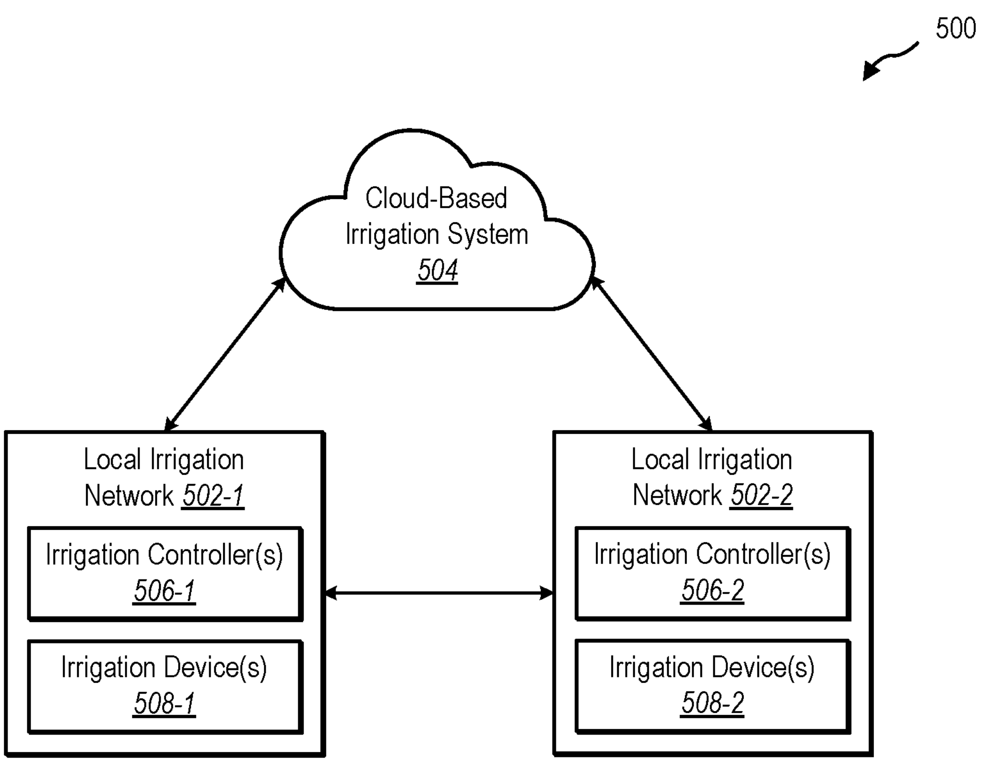
FIG. 5 is a representation of a cross-network irrigation system, according to at least one embodiment of the present disclosure.

FIG. 5 is a representation of a cross-network irrigation system 500, according to at least one embodiment of the present disclosure. The cross-network irrigation system 500 includes a plurality of local irrigation networks (collectively 502) that are connected to a cloud-based irrigation network 504. The local irrigation networks 502 may each include one or more local irrigation controllers (collectively 506). The local irrigation controllers 506 may be in control of one or more irrigation zones. The local irrigation controllers 506 may be electronically connected to one or more irrigation devices (collectively 508). The irrigation devices 508 may include any type of irrigation device. For example, the irrigation devices 508 may include valves, sprinkler heads, flow sensors, moisture sensors, weather sensors, any other irrigation device, and combinations thereof.

In some embodiments, the irrigation devices 508 may include a valve in a water line. The valve may control the flow of water from a water main to various sprinkler heads and other irrigation devices 508. The local irrigation controllers 506 may instruct the valve to open at a particular time of day, stay open for a particular duration, and close after the duration. The water main may have a limited water supply, and so a watering system may include multiple valves that direct water to multiple watering zones. Each of the local irrigation controllers 506 may be able to control a number of zones or other irrigation devices 508. In some situations, the watering area may have more zones than a single local irrigation controller 506 may control. The local irrigation network 502 may include multiple local irrigation controllers 506 to control all of the watering zones.

In some embodiments, the local irrigation controllers 506 and/or the irrigation devices 508 may be in communication over the local irrigation network 502. For example, each of the local irrigation controllers 506 may be in communication with each other over the local irrigation network 502. In some embodiments, the irrigation devices 508 may be in communication one or more of the local irrigation controllers 506 over the local irrigation network 502.

In some embodiments, the local irrigation networks 502 may be wireless networks. For example, the local irrigation networks 502 may include a Wi-Fi network, and each of the local irrigation controllers 506 and/or the irrigation devices 508 may be connected to the Wi-Fi network. In some examples, the local irrigation networks 502 may include other wireless communications between the local irrigation controllers 506 and/or irrigation devices 508. Such wireless communications may include radio communications, infrared, Bluetooth, Zigbee protocol, LoRa radio, cellular networks, any other wireless communication system or method, and combinations thereof.

In the embodiment shown, the cloud-based irrigation network 504 includes a first local irrigation network 502-1 having a first irrigation controller 506-1 and a first irrigation device 508-1. A second local irrigation network 502-2 has a second irrigation controller 506-2 and a second irrigation device 508-2. The first local irrigation network 502-1 and the second local irrigation network 502-2 may be connected to the cloud-based irrigation network 504. For example, the first local irrigation network 502-1 and the second local irrigation network 502-2 may be connected to the cloud-based irrigation network 504 over the Internet.

In accordance with at least one embodiment of the present disclosure, two local irrigation controllers 506 from different local irrigation networks 502 may be located within communication range of each other. For example, the first irrigation controller 506-1 and the second irrigation controller 506-2 may be in communication range of each other. In some embodiments, the first irrigation controller 506-1 and the second irrigation controller 506-2 may be in wireless communication range. For example, the first irrigation controller 506-1 and the second irrigation controller 506-2 may be in wireless communication over a long-range wireless communication protocol, such as LoRa or other long-range wireless communication protocol.

The first irrigation controller 506-1 and the second irrigation controller 506-2 may communicate directly with each other. For example, the first irrigation controller 506-1 and the second irrigation controller 506-2 may be in wireless communication with each other. The first irrigation controller 506-1 and the second irrigation controller 506-2 may transmit information to each other.

In some embodiments, the local irrigation controllers 506 may connect to each other and inform the cloud-based irrigation network 504 of the connection. In some embodiments, the cloud-based irrigation network 504 may instruct the first irrigation controller 506-1 to provide irrigation information and/or irrigation instructions to the second irrigation controller 506-2. This may help to improve the communication between the cloud-based irrigation network 504 and the second irrigation controller 506-2. For example, the second irrigation controller 506-2 may have a limited and/or unreliable connection to the cloud-based irrigation network 504. To ensure that the second irrigation controller 506-2 receives the irrigation information and/or the irrigation instructions, the cloud-based irrigation network 504 may transmit the irrigation information to the second irrigation controller 506-2 through the first irrigation controller 506-1.

In some embodiments, the cloud-based irrigation network 504 may determine the fastest path for the irrigation information and/or the irrigation instructions to reach the second irrigation controller 506-2. For example, the cloud-based irrigation network 504 may determine, based on the connection between the cloud-based irrigation network 504 and the second irrigation controller 506-2, the speed of a communication between the cloud-based irrigation network 504 and the second irrigation controller 506-2. The cloud-based irrigation network 504 may compare this speed with the speed of transmission to the first irrigation controller 506-1 and from the first irrigation controller 506-1 to the second irrigation controller 506-2. Based on the determined speeds, the cloud-based irrigation network 504 may choose a path between the local irrigation controllers 506. In this manner, the cloud-based irrigation network 504 may determine which path will get the irrigation information and/or irrigation instructions to the second irrigation controller 506-2.

In some embodiments, the first irrigation controller 506-1 may transmit the irrigation information and/or irrigation instructions to the second irrigation controller 506-2 to reduce the amount of data transmitted to the second irrigation controller 506-2 over the Internet. This may help to reduce the use of limited bandwidth and/or reduce the amount of data applied to limited data caps. In some embodiments, the first irrigation controller 506-1 may transmit the irrigation information and/or irrigation instructions to the second irrigation controller 506-2 during off-times, to reduce communication bandwidth.

Figure 6:
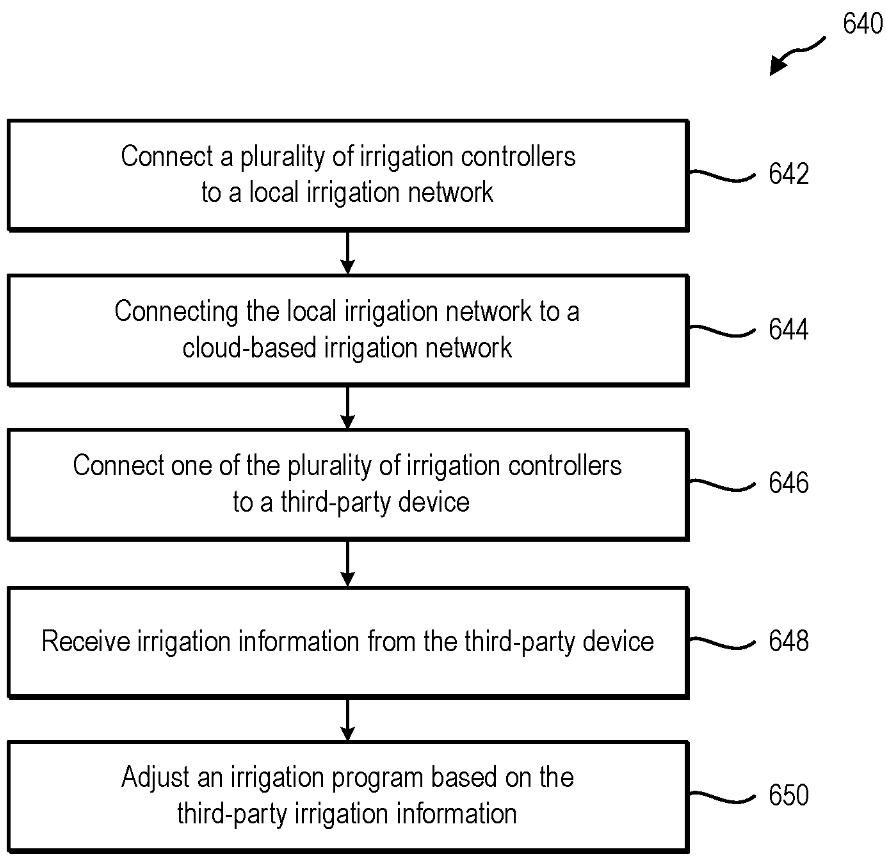
FIG. 6 is a flowchart of a method for irrigation management, according to at least one embodiment of the present disclosure.
Figure 7:
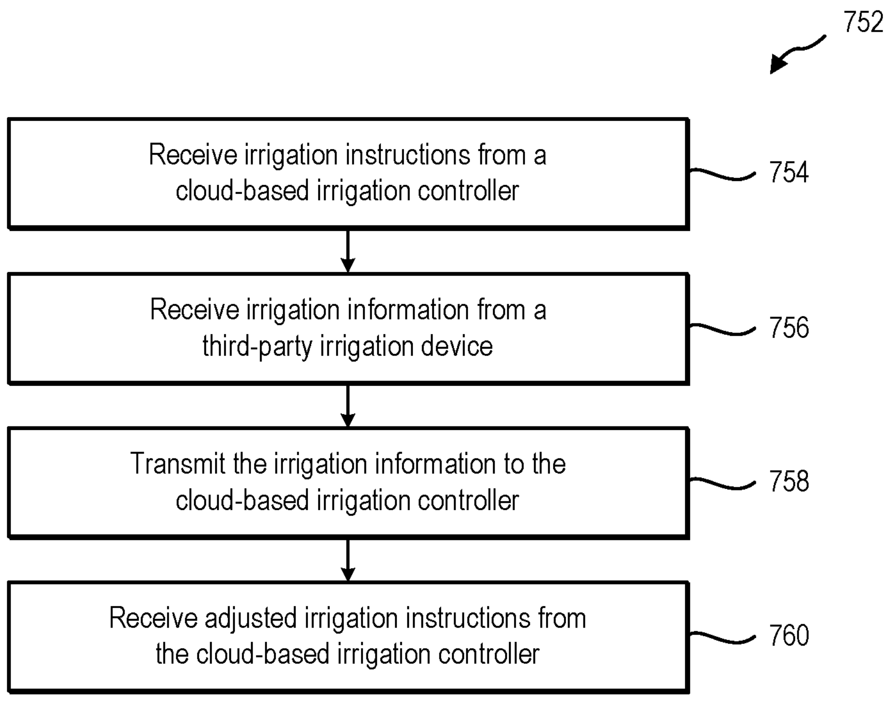
FIG. 7 is a flowchart of a method for irrigation management, according to at least one embodiment of the present disclosure.

FIGS. 6 and 7, the corresponding text, and the examples provide a number of different methods, systems, devices, and non-transitory computer-readable media of the cross-network irrigation system. In addition to the foregoing, one or more embodiments can also be described in terms of flowcharts comprising acts for accomplishing a particular result, as shown in FIGS. 6 and 7. FIGS. 6 and 7 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a method 640 or a series of acts for irrigation management in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

An irrigation manager may connect a plurality of irrigation controllers to a local irrigation network at 642. The local irrigation network may include wireless connections between the plurality of irrigation controllers. In some embodiments, the local irrigation network may be connected to a cloud-based irrigation network at 644. One of the plurality of irrigation controllers may be connected to a third-party device at 646. The third-party device may be physically located in wireless communication range of the one of the plurality of irrigation controllers. The irrigation manager may receive third-party irrigation information from the third-party device via the one of the plurality of irrigation controllers at 648. For example, the irrigation controller may transmit the third-party irrigation information to the cloud-based irrigation network. The irrigation manager may adjust an irrigation program based on the third-party irrigation information at 650. In some embodiments, the irrigation program may be adjusted at the cloud-based irrigation network.

In some embodiments, the third-party device may transmit the third-party irrigation information to each of the plurality of irrigation controllers. In some embodiments, the third-party device is an IOT device. In some embodiments, the third-party device is an irrigation device that is not connected to the local irrigation network. In some embodiments, the third-party device is a sensor, such as a moisture sensor, a flow sensor, a temperature sensor, a weather sensor, and combinations thereof. In some embodiments, the local network includes a first Wi-Fi network and the third-party network to which the third-party device is connected is a second Wi-Fi network.

As mentioned, FIG. 7 illustrates a flowchart of a method 752 or a series of acts for irrigation management in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

In some embodiments, a local irrigation controller may receive irrigation instructions from a cloud-based irrigation controller at 754. The local irrigation controller may receive third-party irrigation information from a third-party irrigation device at 756. The local irrigation controller may transmit the irrigation information to the cloud-based irrigation controller at 758. In some embodiments, the local irrigation controller may receive adjusted irrigation instructions from the cloud-based irrigation controller at 760. The adjusted irrigation instructions may be updated at the cloud-based irrigation controller based on the irrigation information.

In some embodiments, the local irrigation controller may transmit the updated irrigation instructions to a connected local irrigation controller. The connected local irrigation controller may not be connected to the cloud-based irrigation controller. The updated irrigation instructions are transmitted to the connected local irrigation controller via the local irrigation controller. In some embodiments, the local irrigation controller and the connected irrigation controller are in direct communication via a long-range wireless signal. In some embodiments, the local irrigation controller may receive instructions, from the cloud-based irrigation controller, to transmit the irrigation information to the connected irrigation controller through the cloud-based irrigation controller.

Figure 8:
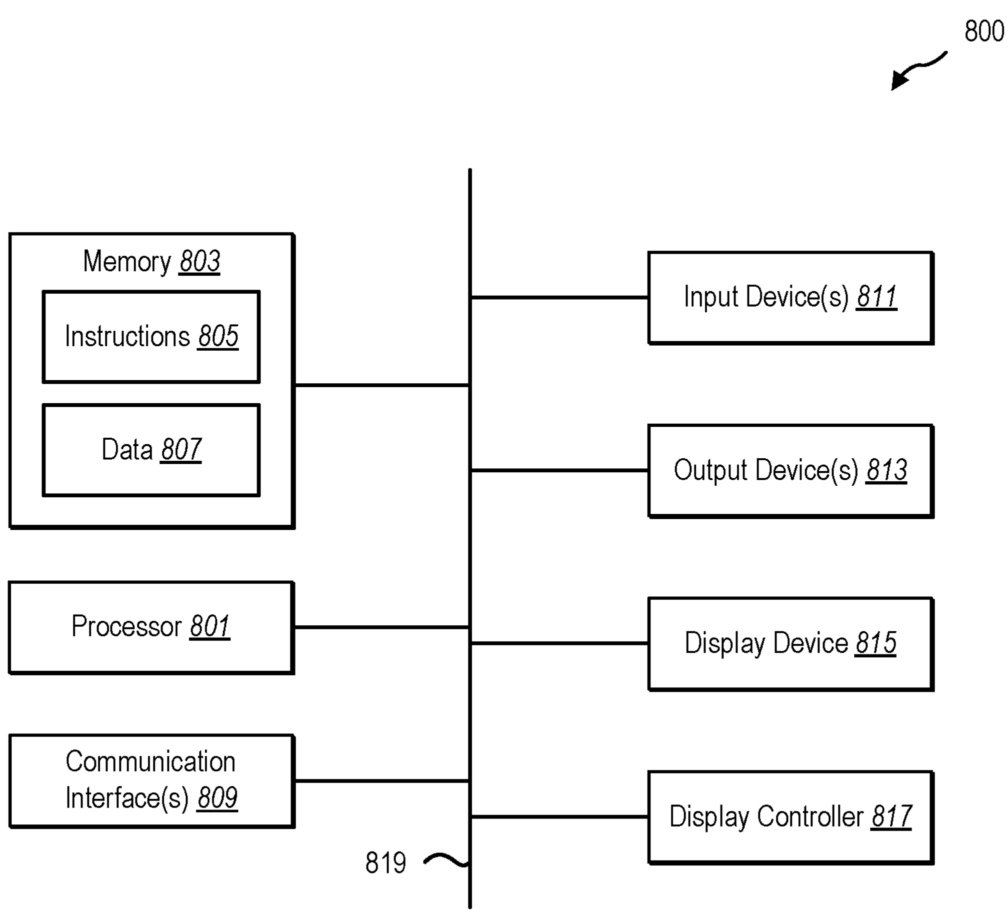
FIG. 8 illustrates certain components that may be included within a computer system, according to at least one embodiment of the present disclosure.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

connecting a plurality of irrigation controllers to a local irrigation network; connecting the local irrigation network to a cloud-based irrigation controller connected to a cloud-based network;

detecting a third-party network in range of a local controller of the plurality of irrigation controllers, the local controller connected to the local irrigation network;

based on detecting the third-party network, identifying a third-party device in communication range of the local controller;

wherein the third-party device is connected to the third-party network;

connecting the local controller to the third-party device, wherein the third-party device is not in direct communication with the cloud-based network; and receiving third-party irrigation information from the third-party device via the local irrigation controller.

2. The method of claim 1, further comprising adjusting an irrigation program based on the third-party irrigation information.

3. The method of claim 1, further comprising transmitting the third-party irrigation information to the cloud-based irrigation network.

4. The method of claim 3, wherein adjusting the irrigation program occurs at the cloud-based network.

5. The method of claim 1, further comprising transmitting the third-party irrigation information to each of the plurality of irrigation controllers.

6. The method of claim 1, wherein the third-party device includes an internet-of-things (IOT) device.

7. The method of claim 1, wherein the third-party device includes an irrigation device.

8. The method of claim 1, wherein the third-party device is in direct communication with the one of the plurality of irrigation controllers.

9. The method of claim 1, wherein the third-party device includes a sensor.

10. The method of claim 1, wherein the local irrigation network includes a first Wi-Fi network and the third-party network includes a second Wi-Fi network.

* * * * *